United States Patent [19]

Issagholian-Havai et al.

[11] Patent Number: 5,352,000
[45] Date of Patent: Oct. 4, 1994

[54] FLANGE CONNECTOR FOR AIR DUCT WITH DETENT ADJACENT SEALING MATERIAL

[75] Inventors: Robert Issagholian-Havai, Tujunga; George J. Ohandjanian, Los Angeles, both of Calif.

[73] Assignee: Mez Industries, Inc., Scottsdale, Ariz.

[21] Appl. No.: 8,685

[22] Filed: Jan. 25, 1993

[51] Int. Cl.⁵ .............................. F16L 23/00
[52] U.S. Cl. .................. 285/405; 285/424; 285/915
[58] Field of Search ............ 285/405, 406, 424, 363, 285/915; 403/405.1

[56] References Cited

U.S. PATENT DOCUMENTS

| | | | |
|---|---|---|---|
| 4,410,206 | 10/1983 | Mez | 285/405 |
| 4,558,892 | 12/1985 | Daw et al. | 285/424 |
| 4,836,585 | 6/1989 | Schaver | 285/424 |
| 4,881,762 | 11/1989 | Arnoldt | 285/424 |
| 4,940,264 | 7/1990 | Mez | 285/424 |
| 5,165,736 | 11/1992 | De Waal | 285/363 |

Primary Examiner—Eric K. Nicholson
Attorney, Agent, or Firm—Tod R. Nissle

[57] ABSTRACT

A flange connection for an air conditioning duct comprises a generally L-shaped hollow flange having a pair of opposing spaced apart stay members which form multiple mechanical and adhesive seals to tightly secure the wall of an air conditioning duct in the flange.

4 Claims, 4 Drawing Sheets

FLANGE CONNECTOR FOR AIR DUCT WITH DETENT ADJACENT SEALING MATERIAL

This invention relates to a flange connection for air conditioning ducts.

More particularly, the invention relates to a generally L-shaped hollow flange connection having a pair of opposing spaced apart stay members which form multiple mechanical and adhesive seals to tightly secure the wall of an air conditioning duct in the flange connection.

Flange connections for air conditioning ducts are well known in the art. See, for example, U.S. Pat. Nos. 4,940,264 to Mez and 5,054,823 to Arnoldt. Such flange connections are slidably attached to the wall of an air duct and are then secured to the air ducts by welds, screws, or other fastening means. A common concern in such flange connections is forming a secure seal between the flange connection and the wall of the air conditioning duct to which the flange connection is attached. In this respect, the use of a putty like sealing material a continuous seal is well known in the art. Another concern in such flange connection is to insure that welds, nails, or other fasteners which are used to connect a flange connection to the wall of an air duct are, to improve the structural integrity of the duct wall-flange connection, are made along a designated line on the flange connection.

Accordingly, it would be highly desirable to provide an improved flange connection which would improve the seal between a flange connection and the wall of an air duct and which would insure that welds and other fasteners used to secure the flange connection and air duct together are made along a straight line.

Therefore, it is a principal object of the invention to provide an improved flange connection for an air duct.

Another object of the invention is to provide an improved air duct flange connection of the type described which provides multiple mechanical and adhesive seals to insure that the flange connection is effectively sealed to the wall of an air duct.

A further object of the invention is to provide an improved air duct flange connection of the type described which facilitates the inserting of screws to secure an air duct wall in the flange connection against an adhesive sealant.

These, and other, further and more specific objects and advantages of the invention will be apparent to those skilled in the art from the following detailed description thereof, taken in conjunction with the drawings, in which.

Figure 1:
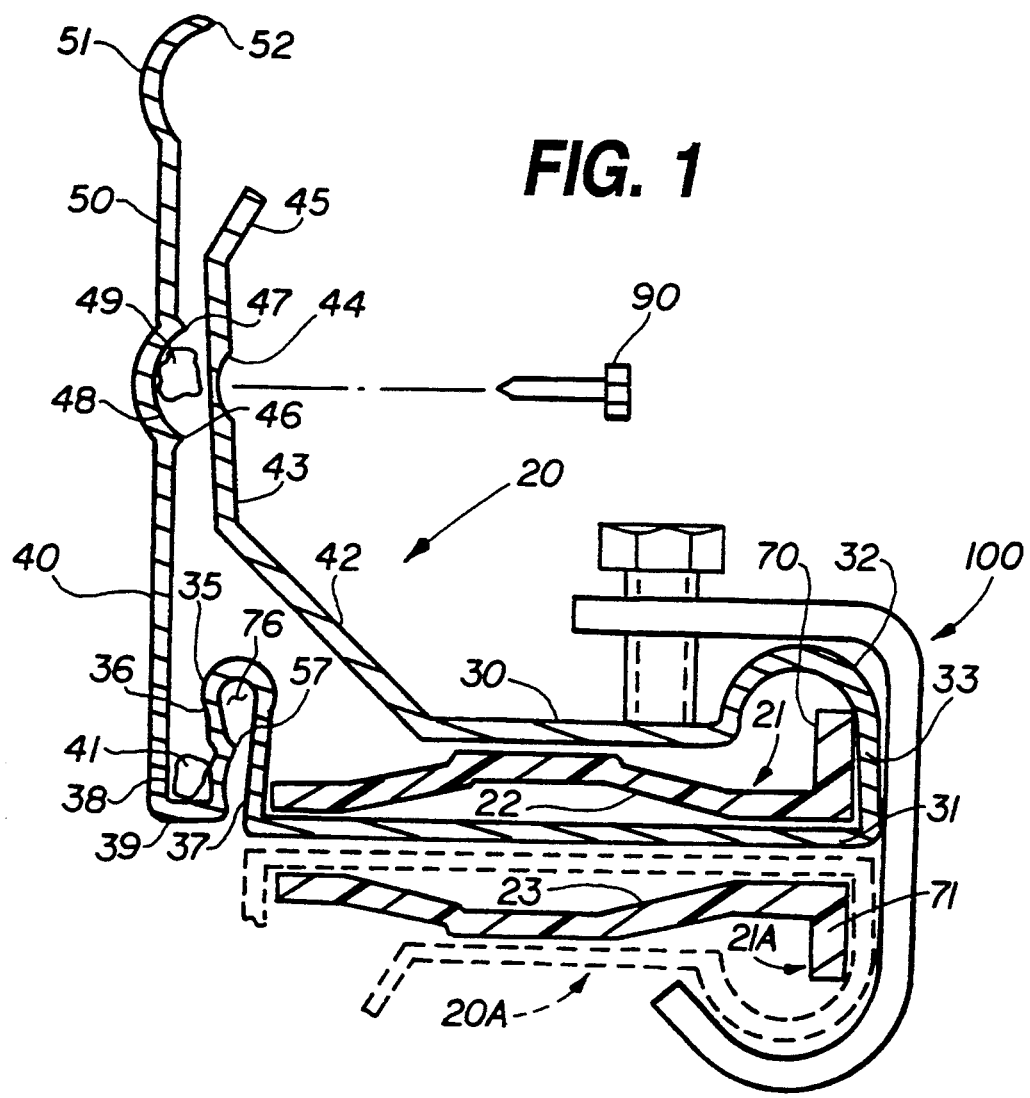
FIG. 1 is an end section view illustrating a flange connection constructed in accordance with the principles of the invention.

Briefly, in accordance with our invention, we provide an improved flange connection for an air conditioning duct. The air conditioning duct includes at least one wall having a leading edge. The flange connection comprises a generally L-shaped hollow profile slidably fitted onto the duct wall and includes a first stay member; a second stay member spaced apart from and opposing the first stay member and including a first portion, a second portion, and a third portion intermediate the first and second portions. The third portion includes an elongate detent opposing and spaced apart from the first stay member, and, sealing material in the detent intermediate the first and second stay members. A third stay member is attached to and outwardly extends from the second stay member. The duct wall is slidably inserted between the first and second stay members such that the leading edge slides sequentially over the first portion, the third portion and the sealing material, and the second portion, and such that the leading edge of the duct wall is positioned adjacent the third stay member.

In another embodiment of our invention, we provide a flange connection for an air duct. The air duct includes at least one wall having a leading edge. The flange connection comprises a generally L-shaped hollow profile slidably fitted onto said duct wall and includes a first stay member and a second stay member spaced apart from and opposing the first stay member. The second stay member includes a first portion; a second portion generally coplanar with the first portion; and a third portion intermediate the first and second portions. The third portion includes at least one elongate ridge outwardly extending from the first and second portions. A third stay member is attached to and outwardly extends from the second stay member. The wall of the duct is slidably inserted between the first and second stay members such that the leading edge slides sequentially over the first portion, the third portion, and the second portion. The elongate ridge forms a mechanical seal by bearing against the duct wall to press the wall against the first stay member.

In still another embodiment of our invention, we provide a flange connection for an air duct. The duct includes at least one wall having a leading edge. The flange connection comprises a generally L-shaped hollow profile slidably fitted onto the duct wall and including a first stay member having an inner and outer surface and including an elongate detent formed in the outer surface; and, a second stay member spaced apart from and opposing the first stay member. The second stay member includes a first portion; a second portion; and a third portion intermediate the first and second portions and including sealant material intermediate the first and second stay members. A third stay member is attached to and outwardly extends from the second stay member. The duct wall is slidably inserted between the first and second stay member such that the leading edge of the duct wall slides sequentially over the first portion, the third portion and the sealing material, and, the second portion. The leading edge is positioned adjacent the third stay member. The detent defines a line along which fasteners can be inserted through the first stay member, the duct wall, the sealant material, and the second stay member to sealingly secure the duct wall in the flange connection.

Figure 4:
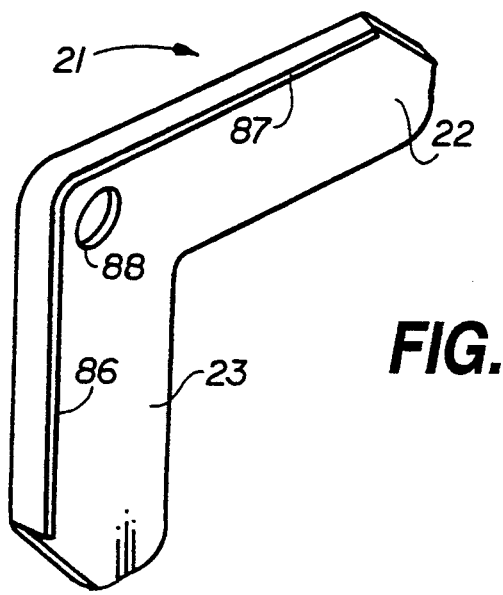
FIG. 4 is a perspective view illustrating a corner used to attach a pair of co-terminating flange connections mounted on a pair of perpendicular co-terminating walls in a rectangular air duct; and, FIG. 5 is a perspective view illustrating a pair of air duct sections which can be interconnection with the flange connection of the invention.
Figure 5:
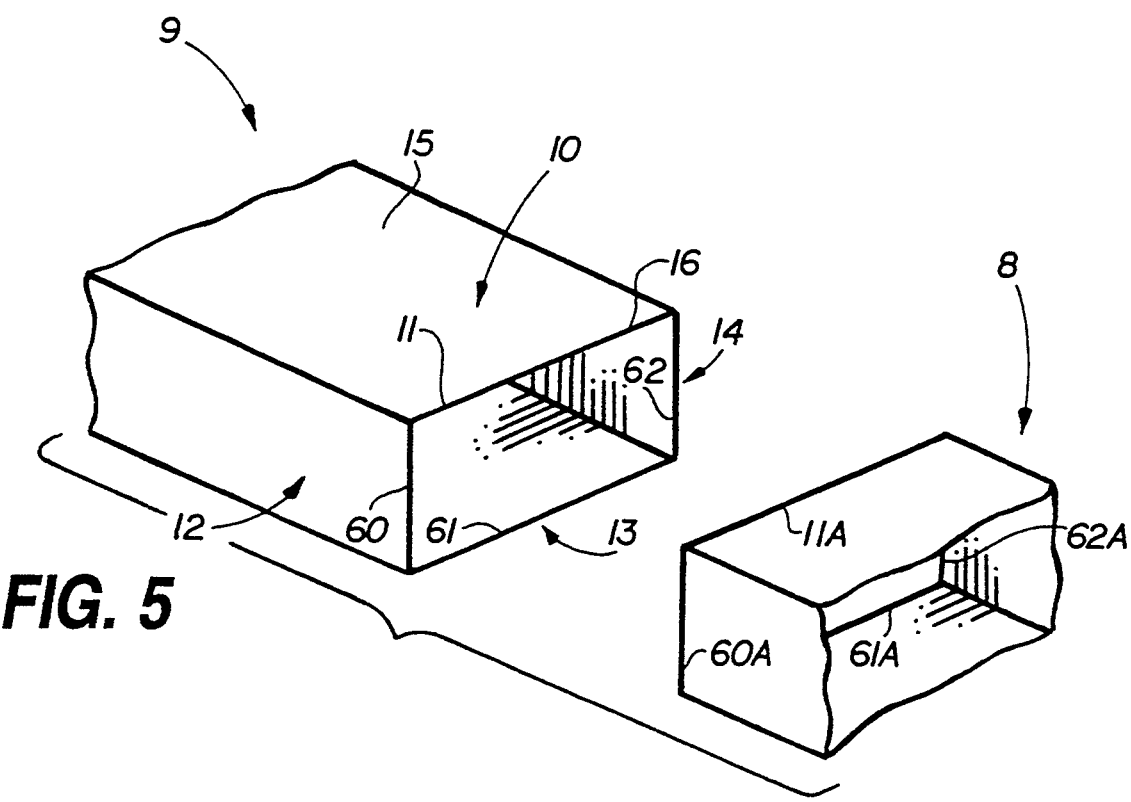

Turning now to the drawings, which depict the presently preferred embodiment of the invention for the purpose of illustrating the practice thereof and not by way of limitation of the invention, and in which like reference characters refer to corresponding elements throughout the several views, an air conditioning duct 9 (FIG. 5) includes four sheet-metal walls 10, 12, 13 and 14. Wall 10 has an inner surface 16 and outer surface 15. At the end of the duct 9 are four flange-connector-frame pieces 20 each typically consisting of endlessly rolled sheet metal. Each piece 20 slips over and extends parallel to one of end edges 16, 60, 61, 62 of duct 9. The four pieces 20 are joined together by four angle brackets or corners 21 (FIG. 4) whose ends 22 and 23 are fitted into pieces 20. Corners 21 also each include an aperture 88 formed therethrough and outwardly projecting edges or lips 86, 87 attached to ends 22, 23, respectively.

Each piece 20 includes back stays 40 and 50 which extend along the inside parallel to a wall 10, 12, 13, 14. For sake of example, wall 10 is illustrated in FIG. 2. Stays 40 and 50 are interconnected by elongate arcuate member 48. Member 48 is provided with a sealer composition and defines a concave detent or groove which helps retain the sealer composition in position in member 48. Elongate V-shaped ridges 46 and 47 extend outwardly from the top and bottom (in FIGS. 1 and 2) of member 48 and, as will be described, function as mechanical seals when a wall 10, 12, 13, 14 is inserted in a piece 20 in the manner illustrated in FIG. 2. After a 90 degree bend, stay 40 runs into stay 39. Stay 40, after a 90 degree bend, runs into catch strip 36. V-shaped outwardly projecting ridge 57 extends outwardly from catch strip 36. One hundred and eighty degree bend 35 interconnects strip 36 and stay 34. Strip 36, bend 35, and stay 34 bound and define elongate open aperture 76 extending parallel to edge 11. After a ninety degree bend, stay 34 runs into stay 31. After a ninety degree bend 63, stay 31 runs into narrow cross stay 33, followed by a 180 degree bend which runs into stay 30. After a forty-five degree bend 64, sloping stay 42 runs into forty-five degree bend 65, followed by cover stay 43. Duct wall 10 lies against the inside of cover stay 43. Elongate arcuate groove 44 is formed in stay 43 and is opposed and generally parallel to groove 48. Arcuate projection 51 extends outwardly from stay 50 and includes strip 52 which, as will be described, functions as a mechanical seal.

Figure 3:
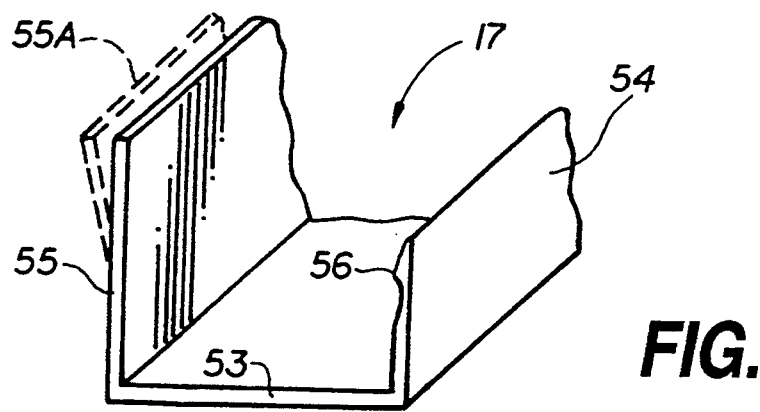
FIG. 3 is a partial perspective view of a U-shaped strip used to secure an insulating mat to the inner wall of an air duct and to the flange connection of FIG. 1.

In FIG. 3, holding strip 17 is continuously roll formed from a strip of galvanized steel. Strip 17 includes outer wall 55, flat cross piece 53 and catch strip 54. The upper portion of outer wall 55 can flare outwardly in the manner indicated by dashed lines 55A in FIG. 3. V-shaped ridge 56 extends inwardly from strip 54. Wall 55 runs into piece 53 after a ninety degree bend. Piece 53 runs into catch strip 54 after about a ninety degree bend. Strip 54 fits into aperture 37. Ridge 56 snaps over ridge 57 in the manner illustrated in FIG. 2. Insulating material 18 fits into strip 17 and is held adjacent wall 10 and stays 40 and 50 in the manner illustrated in FIG. 2. Strip 17 can be cemented to material 18, or, strip 17 can be shaped and dimensioned such that the edge 70 must be squeezed and force fit into strip 17 such that the compressive forces generated on edge 70 by strip 17 secure edge 70 in strip 17. Threaded fasteners or any other desired means can be used to secure edge 70 in position in strip 17.

In use, an edge 11 of a wall 10 duct 9 is slid into a piece 20 in the manner illustrated in FIG. 2. Wall 10 is compressed between stay 43 and ridges 46 and 47 to form a pair of mechanical seals. Projection 51 is shaped and dimensioned such that strip 52 bears against wall 10 and forms a third mechanical seal. Sealing material 49 extends between member 48 and wall 10. Material 49 can also, though not shown, extend between wall 10 and stay 43. Sealing material 41 extends between edge 11 and stay 40, stay 39, and catch strip 36. Groove 44 indicates to a user where a welding spot can be made which extends from groove 44 generally perpendicular to stays 43 and 50 and through stay 3, wall 10, and member 48. Instead of or in addition to welding spots, screws or other fasteners can be turned through stay 43, wall 10 and member 48.

Figure 2:
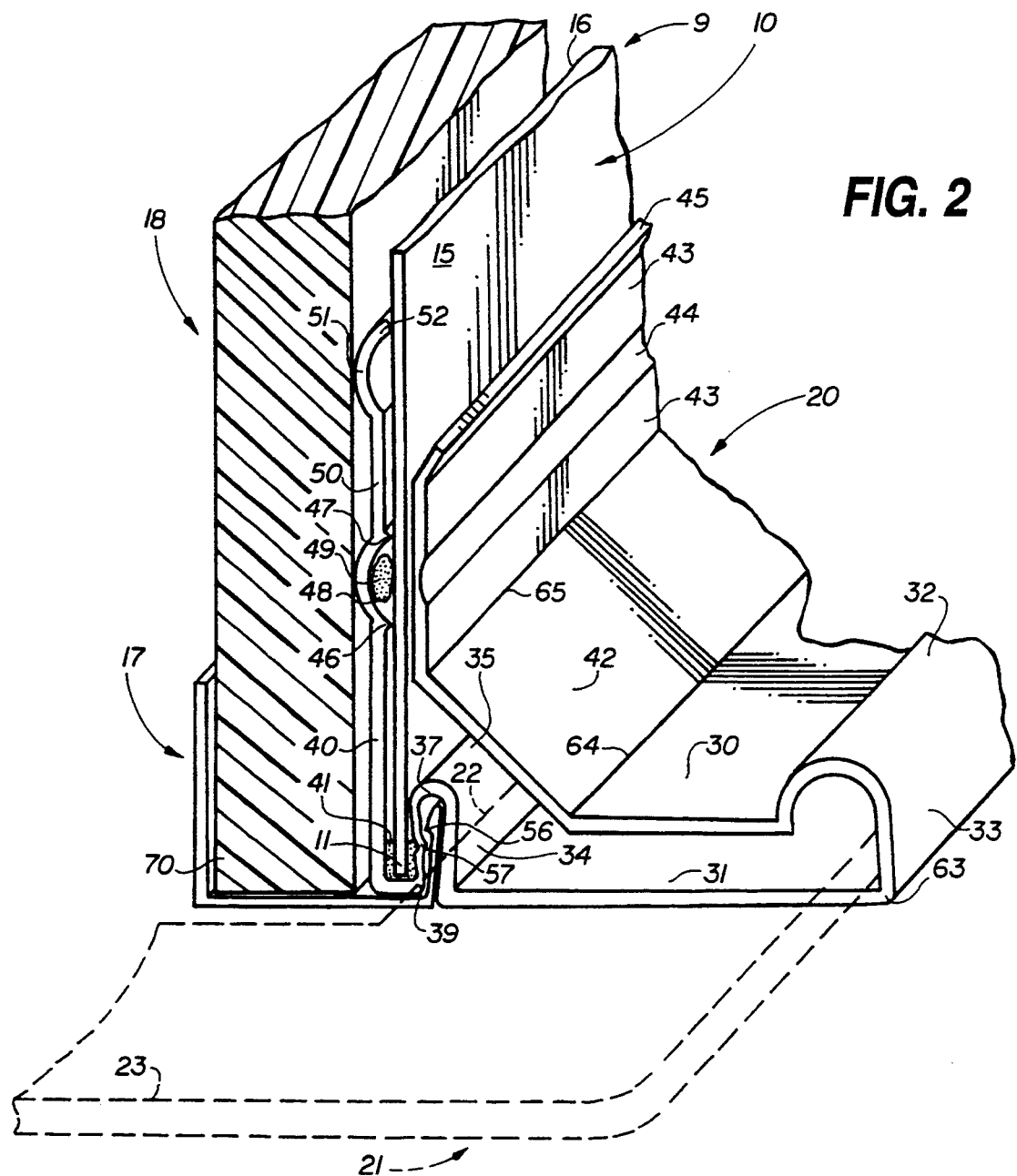
FIG. 2 is a perspective view illustrating the flange connection of FIG. 1 in conjunction with an air duct and an insulating mat secured to the inner wall of the air duct.
Figure 6:
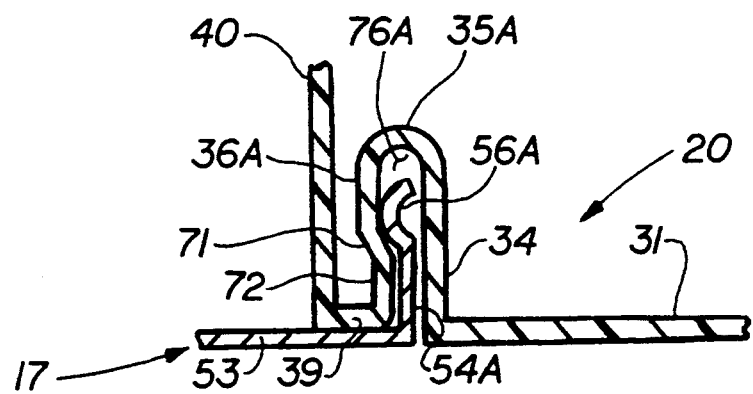
FIG. 6 is an end section view of a flange connection illustrating an alternate embodiment of FIG. 1.

FIG. 6 illustrates an alternate embodiment of piece 20 in which is identical to that depicted in FIGS. 1 and 2 except that bend 35, catch strip 36, and aperture 76 are altered in the manner illustrated by bend 35A, strip 36A-71-72, and aperture 76A in FIG. 6. Similarly, the catch strip 54 and ridge 56 of holding strip 17 are altered in the manner illustrated by catch strip 54A and ridge 56A in FIG. 6 such that catch strip 54A snaps into aperture 76A in the manner shown in FIG. 6.

Self drilling threaded screws 90 can be inserted through detent 44, a duct wall 10, sealant 49, and member 48 to secure wall 10 in position in the flange connection of FIG. 1. Detent 44 defines a line along which screws 90 can be inserted such that the screws will pass through sealant 49 and member 48. Detent 44 reduces the thickness of stay 43 and facilitates the formation of welds through detent 44, duct wall 10, sealant 49, and member 48.

In FIG. 1, flange connector 20A is attached to edge 11A of duct section 8 (FIG. 5), and U-shaped clamp 100 is used in conventional fashion to secure together connectors 20, 20A, and, subsequently, duct sections 8 and 9. Alternatively, adjacent flange connectors 20 and 20A can be held together by, in conventional fashion, inserting a bolt through apertures 88 formed through adjacent corners 21. For each the end of each duct 8, 9 in FIG. 5, four corners 21 would be used to connect together four lengths of flange connector 20 on the end of each duct 8, 9 in FIG. 5. For example, for duct section 9, one flange connector 20 would extend along edge 11, another connector 20 would extend along edge 61, another connector 20 would extend along edge 60, and another length of connector 20 would extend along edge 62. One corner 21 would at the corner where edges 11 and 62 co-terminate interconnect the flange connectors along edges 11 and 62. A second corner 21 would, at the corner where edges 11 and 60 co-terminate, interconnect the flange connectors along edges 11 and 60, etc. Each end 22, 23 of a corner 21 slides into a flange connector 20 intermediate stays 30, 31 in the manner indicated in FIGS. 1 and 2. Each end 22, 23 is generally normal to stays 43, 50 and to the walls 10, 12, 13, 14 of duct section 9.

Having described our invention in such terms as to enable those skilled in the art to understand and practice it, and having identified the presently preferred embodiments thereof.

We Claim:

1. A flange connection (20) for an air duct, said duct including at least one wall (10) having a leading edge (11), said flange connection comprising a generally L-shaped profile slidably fitted onto said duct wall and including
(a) a first stay member (43) having an inner and outer surface and including an elongate linear detent (44) formed in said outer surface;
(b) a second stay member spaced apart from and opposing said first stay member (43) and including
(i) a first portion (50),
(ii) a second portion (40),
(iii) a third portion (48) intermediate said first and second portions, and
(iv) sealant material (49) intermediate said first and second stay members; and,
(c) a third stay member (39) attached to and outwardly extending from said second stay member;
said wall (10) being slidably inserted between said first and second stay members such that said leading edge slides sequentially over
said first portion,
said third portion and said sealant material, and
said second portion,
and such that said leading edge (11) is positioned adjacent said third stay member, said detent (44) being opposed and adjacent to said sealant material and defining a visible line along which fasteners can be inserted through said detent and said first stay member, said wall (10), said sealant material, and said second stay member to sealingly secure said wall (10) in said flange connection (20) intermediate said detent and said sealant material.

2. In combination with an air duct assembly, said duct assembly including
an air duct including at least one wall (10) having a leading edge (11), and
a flange connection for the air duct, the flange connection comprising a generally L-shaped profile slidably fitted onto said duct wall and including
a first stay member (43) having an inner and outer surface;
a second stay member spaced apart from and opposing said first stay member (43) and including
a first portion (50),
a second portion (40) generally co-planar with said first portion (50),
a third portion (48) intermediate said first and second portions,
a third stay member (39) attached to and outwardly extending form said second stay member;
said wall (10) being slidably inserted between said first and second stay members such that said leading edge slides sequentially over said
first portion,
third portion, and
second portion,
the improvements sealing together the flange connection and the duct wall, said improvements including
(a) an elongate detent (48) formed in said third portion and opposed to and spaced apart from first stay member;
(b) sealant material (49) in said detent (48) intermediate said first and second stay members;
(c) at least a first elongate ridge (47) adjacent said detent (48) and outwardly extending from said third portion;
(d) a fastener extending through said first stay member, said sealant material, and said third portion to press said wall against said ridge (47) to form a mechanical seal between said wall (10) and said ridge and to compress said wall (10) against said sealant material.

3. The combination of claim 2, wherein said improvements include a second elongate ridge (46) outwardly extending form said third portion and spaced apart from and generally parallel to said first ridge (47), said fastener also pressing said wall against said second ridge to form a mechanical seal between said second ridge and said wall (10), said first and second ridges bounding said detent and said sealant material in said detent.

4. The combination of claim 2, wherein said improvements include an elongate linear detent (44) formed in said outer surface of said first stay member (43), said linear detent (44) being opposed and adjacent to said sealant material and defining a visible line along which said fastener can be inserted through said linear detent (44) and said first stay member, said wall (10), said sealant material, and said second stay member to sealingly secure said wall (10) in said flange connection (20) intermediate said detent and said sealant material.

* * * * *